United States Patent [19]

Lakshmanan et al.

[11] Patent Number: 4,761,450

[45] Date of Patent: Aug. 2, 1988

[54] COMPATIBLE POLYMER BLENDS USEFUL AS MELT ADHESIVES

[75] Inventors: Pallavoor R. Lakshmanan, Houston; Paula J. Carrier, Seabrook, both of Tex.

[73] Assignee: Baychem International, Inc., Houston, Tex.

[21] Appl. No.: 131,580

[22] Filed: Dec. 11, 1987

[51] Int. Cl.$^4$ ............ C08L 23/20; C08L 23/06; C08L 23/08
[52] U.S. Cl. ............ 524/488; 524/481; 524/487; 524/528; 525/240; 525/210
[58] Field of Search ............ 525/240, 210; 524/528, 524/488

[56] References Cited

U.S. PATENT DOCUMENTS

| | | | |
|---|---|---|---|
| 3,220,966 | 11/1965 | Flanagan | 525/240 |
| 3,378,512 | 4/1968 | Hamed et al. | 525/240 |
| 3,514,417 | 5/1970 | Bickel et al. | 525/240 |
| 3,573,240 | 3/1971 | Flanagan | 525/240 |
| 4,022,728 | 5/1977 | Trotter et al. | 525/240 |
| 4,217,428 | 8/1980 | McConnell et al. | 525/240 |
| 4,568,713 | 2/1986 | Hansen et al. | 525/240 |

*Primary Examiner*—Carman J. Seccuro
*Attorney, Agent, or Firm*—Joseph J. Carducci

[57] ABSTRACT

Compatible polymer blends useful as melt adhesives comprising a low density ethylene polymer, a copolymer of butene-1 and ethylene or propylene, a hydrocarbon tackifier and a low molecular weight polymer selected from the group consisting of a low molecular weight liquid polybutene, an amorphous polypropylene and mixtures thereof.

30 Claims, No Drawings

COMPATIBLE POLYMER BLENDS USEFUL AS MELT ADHESIVES

BACKGROUND OF THE INVENTION

1. Field of the Invention

This invention relates to compatible polymer blends useful as melt adhesives comprising (1) a low density ethylene polymer, (2) a copolymer of butene-1 and ethylene or propylene, (3) a hydrocarbon tackifier and (4) a low molecular weight polymer selected from the group consisting of (a) a low molecular weight liquid polybutene, (b) an amorphous (atactic) polypropylene and (c) mixtures thereof.

2. Description of the Prior Art

Hot melt adhesives have found extensive use in industry in bonding, joining or fabrication of various structures, including construction of structures from synthetic polymeric films, such as polyethylene, polypropylene, etc.; foil, including metal foil, such as aluminum; wax-coated or wax-impregnated cellulosic structures; and various non woven materials whose constituents are based on polyolefins, polyesters, polyamides and acrylic-type polymers.

The modern trend in the packaging industry, for example, is to use more of the plastic based or plastic finished constructions, such as polyethylene or polypropylene extrusion coated or laminated boards. Such structures are replacing conventional clay coated boards in many packaging applications. The advantages of using composite construction of plastic to plastic or plastic to paper, and other such combinations, are several, for example, with respect to aesthetics, print graphics, barrier properties toward moisture (humidity), oxygen and order, etc. A better barrier, for example, will prevent or tend to inhibit early spoilage of the packaged contents. Plastic utilized composite constructions are now routinely used for beverage cartons or sleeves, to hold dry goods and consumable items, frozen juice, household detergents and cleaners, poultry and fresh produce packaging, etc.

The change in various packaging laminate and non woven disposal construction structures from paper or paperboard to plastic and non-woven based products also necessitates that the various adhesives chosen to hold the structures together be compatible with the materials of construction, since the altered surface chemistry of such materials may not be adhesion compatible with traditionally available hot melt adhesives.

Thus, it is important that the hot melt adhesives used to prepare the various composites be compatible with the materials of construction and that they exhibit good specific adhesion thereto, particularly wherein such materials are made using synthetic polymers, such as polyethylene, polypropylene, etc.

In addition, since hot melt adhesives are a multicomponent system which experiences prolonged elevated temperature exposures, for example at 350° F., or even higher, in production or use, it is especially important that they show melt stability over a period of time unitl their use and not lose their homogeneity, become unstable and show stratification, resulting in a substantial loss in their adhesive performance. Moreover, some hot melt adhesives, even at such elevated temperatures, are still so viscous, for example, they can have a viscosity at such a temperature well above 15,000 cps, that they can be applied to the substrate with only very great difficulty.

We have found that the novel polymer blends defined and claimed herein, that is, containing a low density ethylene polymer; a copolymer of butene-1 and ethylene or propylene; a hydrocarbon tackifier; and a low molecular weight polymer selected from the group consisting of a low molecular weight liquid polybutene, an amorphous polypropylene and mixtures thereof is eminently useful as a hot melt adhesive with the substrates defined above, in that they are compatible therewith, exhibit remarkable adhesion thereto and remain stable at elevated temperatures of application.

SUMMARY OF THE INVENTION

The novel compatible polymer blends useful as hot melt adhesives defined and claimed herein comprise (1) a low density ethylene polymer, (2) a copolymer of butene-1 and ethylene or propylene, (3) a hydrocarbon tackifier and (4) a low molecular weight polymer selected from the group consisting of (a) a low molecular weight liquid polybutene, (b) an amorphous polypropylene and (c) mixtures of low molecular weight liquid polybutenes and amorphous polypropylenes. It is obvious, as will be seen in the specific runs hereinafter, that the novel polymer blends can include therein more than one of each of the above components.

The low density ethylene polymers used herein can desirably be obtained from conventional film forming as well as other specialty grades of ethylene polymers having a density of about 0.88 to about 0.94, preferably about 0.88 to about 0.93 and a melt index, as determined by ASTM-1238, in the range of about 3 to about 5000 grams/10 minutes, or above, including those which extend into low viscosity values, i.e., about 40 cps at 140° C., preferably from about 20 to about 500 grams/10 minutes, These low density ethylene polymers can be prepared by well known high pressure processes, or by lower pressure processes, by copolymerizing ethylene with $C_3$ and higher alphaolefins. Definitions of low density polyethylenes can be found, for example, in U.S. Pat. Nos. 4,076,670 to Godfrey, 4,120,916 to Meyer, Jr., et al, 4,373,066 to Karim et al and 4,471,086 to Foster.

The copolymer of butene-1 and ethylene or propylene used herein are high molecular weight polymers, generally rigid at atmospheric temperatures but easily flowable when heated. Their melt index, determined in accordance with ASTM D1236 is desirably in the range of about 0.3 to about 2000 grams/10 minutes, and even higher, preferably in the range of about 3.0 to about 2000 grams/10 minutes, at 350° F. Since ethylene, and even propylene, can be present during the polymerization process when butene-1 is polymerized to prepare the butene-1 copolymer that can be used herein, the resulting copolymers will contain from about 1.5 to about 20, generally from about 3.0 to about 10, weight percent of ethylene or propylene. Definitions of suitable butene-1 copolymers can be found, for example, in U.S. Pat. Nos. 3,573,240 to Flanagan and 4,568,713 to Hansen.

The hydrocarbon tackifiers suitable for use herein can be selected from any hydrocarbon tackifier generally used, or suitable for use, in the preparation of hot melt adhesives. A particularly suitable tackifier can be obtained from commercially available hydrocarbon resins resulting from the polymerization of monomers consisting of olefins, cycloolefins and diolefins, for example, residual byproduct monomers resulting from the manufacture of isoprene. Such tackifiers are described, for example, in U.S. Pat. Nos. 3,932,330 to Lakshmanan, 4,022,728 to Trotter et al and 4,072,735 to Ardemagni. Such petroleum derived hydrocarbon resins are sometimes referred to also as synthetic terpene resins. Other types of tackifiers included for use herein include conventional terpene resins and modified terpene resins obtained as a result of the polymerization of such terpene derived monomers, such as alpha- and beta-pinene and limonene. Petroleum hydrocarbon resins that have been post hydrogenated to yield a more thermally stable resin can also be used. The tackifiers used herein to prepare the novel hot melt adhesive herein will typically exhibit a ring and ball softening point (ASTM E 28) in the range of about 10° to about 150° C., generally in the range of about 10° to about 140° C.

The fourth necessary component used to prepare the novel hot melt adhesives is either a low molecular weight liquid polybutene, an amorphous polypropylene or mixtures of the two.

The low molecular weight liquid polybutenes used herein are polymers of isobutylene and butenes, composed predominately of monoolefins having four carbon atoms, that is, from about 85 to about 98 weight percent, with the remainder being composed predominantly of isoparaffins, having a molecular weight (as determined by a Mechrolab Osmometer) in the range of about 500 to about 5000, generally from about 1300 to 3000. Such polybutenes are described, for example, in U.S. Pat. No. 4,072,735 to Ardemagni.

The amorphous polypropylenes, including amorphous polyalphaolefins, used herein to prepare the novel hot melt adhesive are soluble in hydrocarbon solvents, such as pentane, hexane, etc., have a crystallinity of less than about 10 weight percent, preferably less than about five weight percent, and possesses a molecular weight in the range of about 300 to about 20,000, preferably about 1000 to about 15,000. The method used in preparing the amorphous polypropylene or amorphous polyalphaolefins, and recovering the same, has no effect on its utilization in the preparation of the novel hot melt adhesive claimed herein. Thus, amorphous polypropylene formed as a byproduct in minor amounts during the production of crystalline polypropylene by the polymerization of propylene in the presence of stereospecific catalysts by processes disclosed, for example, in U.S. Pat. No. 3,679,775 to Hagemeyer et al can be used. On the other hand, amorphous polypropylene (amorphous polyalphaolefins) produced directly, without the production of crystalline copolymers of propylene and lower olefins, as disclosed, for example, in said U.S. Pat. No. 3,679,775 to Hagemeyer et al can also be used. While the amorphous polypropylenes (amorphous polyalphaolefins) used herein can be homopolymers of propylene, it is within the purview of our invention to use substantially amorphous products based on propylene copolymerized with olefins, such as ethylene, butene, pentene, hexene, nonene, decene, etc., whether such products have been obtained intentionally or as by-products. Such amorphous polyalphaolefin copolymers can have a melt viscosity in the range of about 200 to about 50,000, or even higher, cps at 375° F. (ASTM D 3236). These copolymers will contain propylene in an amount ranging from about 25 to about 99.5, or even higher, weight percent, generally from about 50 to about 99.5, or even higher, weight percent, with the remainder being the one or more of the other olefins defined above. The amorphous polyalphaolefins useful herein are further described, for example, in U.S. Pat. Nos. 3,900,694 to Jurrens, 3,923,758 to Carter, Jr. et al, 3,954,697 to McConnell at al, 4,022,728 to Trotter et al, 4,120,916 to Meyer et al, 4,210,570 to Trotter et al, 4,259,470 to Trotter et al, 4,264,756 to Trotter et al and 4,288,358 to Trotter et al.

The four components required to obtain the novel hot melt adhesive herein can be present in the amounts defined below in Table I.

TABLE I

| | Broad Range | Preferred Range |
|---|---|---|
| (1) Low Density Ethylene Polymer | 2.5–40 | 5–30 |
| (2) Butene-1 Copolymer | 5–60 | 10–50 |
| (3) Hydrocarbon Tackifier | 5–40 | 10–35 |
| (4) Low Molecular Weight Liquid Polybutene or Amorphous Polypropylene | 5–60 5–87.5 | 10–40 10–75 |

In addition to the amounts shown above in Table I the weight ratio of low density ethylene polymer to the butene-1 copolymer will be in the range of about 9:1 to 1:9, preferably in the range of about 1:3 to about 3:1. When a mixture of low molecular weight polybutene and amorphous polypropylene is used, the amount of amorphous polypropylene present in such mixture can be in the range of about 97.5 to about 2.5 weight percent, generally in the range of about 75 to about 40 weight percent, with the remainder being the low molecular weight liquid polybutene.

In an embodiment herein, our novel hot melt adhesive can have incorporated therein a paraffin or a microcrystalline wax in order to reduce the viscosity thereof to facilitate the application of the adhesive to a substrate. Paraffin waxes used are those composed mainly of straight chain or branched chain molecules. Fully refined paraffins are hard and brittle with melting points ranging from about 115° to about 155° F. Microcrystalline waxes that are useful are those that are complex mixtures of monocyclic and polycyclic hydrocarbons, along with lesser amounts of branch chains and isoparaffins containing only minor amounts of normal paraffins. The crystals of microcrystalline waxes are much smaller than those of paraffin waxes. The melting points of the microcrystalline waxes will range from about 140° to about 190° F. When a wax is used it can be present in an amount upto about 40 weight percent, based on the final adhesive composition, but generally the amount used will be less than about 25 weight percent.

Since hot melt adhesives tend to experience varying degrees of thermal exposure during thermal processing and/or during application to the substrate, it is desirable to incorporate therein one or more antioxidants in small amounts to inhibit thermal and/or thermooxidative degradation. Several types of commercial products, predominantly of the hindered phenol types, are available for this purpose to function as primary antioxidants. A secondary antioxident belonging to the general classification of thioesters and phosphites can also be used in combination with the hindered phenols. Exemplary of antioxidants suitable for use herein include tetrakis [methylene 3-(3′,5′-di-t-butyl-4-hydroxyphenyl)propionate]methane; 2-2′-ethylidenebis(4,6-di-tertiary-butylphenol); 1,1-3-tris(2-methyl-4-hydroxy-5-t-butyl phenyl)butane; and 1,3,5-trimethyl-2,4,6-tris]3,5-tert-butyl-4-hydroxybenzyl]benzene. Secondary antioxidants, such as dilaurylthiodipropionate; distearylthiodipropionate; pentaerythritotetrakis(beta-laurylthiopropionate) and various alkyl-, aryl-, di- and polyphosphites and thiophosphites, can also be employed in combination with appropriate hindered phenols. Effective amounts of antioxidants that can be used can range from about 0.05 to about 5 weight percent, preferably from about 0.1 to about 2.5 weight percent, based on the weight of the final adhesive composition.

The preparation of the novel melt adhesive claimed herein is not critical and any suitable method can be employed. In a preferred embodiment, a mixing vessel is heated to an elevated temperature, for example, in the range of about 325° to about 400° F. and the low density ethylene polymer, the butene-1 copolymer and the antioxidant, if used, are added thereto. The polymer mixture is allowed to soften under slow mixing and then the tackifier is added and mixing is continued until homogenization occurs. The low molecular weight polybutene, amorphous polypropylene or combinations thereof is then added in small quantities under continued mixing until homogenity of the mixture is attained. If wax is also used, it is added at the time of polybutene or amorphous polypropylene addition. The total mixing time is generally in the range of about 0.5 to about two hours.

DESCRIPTION OF PREFERRED EMBODIMENTS

The present invention can further be illustrated by the following. A number of compositions were prepared using an oil heated Brabender mixing vessel having a compounding bowl with a capacity of 400 milliliters. Before beginning, the mixing vessel was heated to a temperature ranging from 350° to 380° F. The various ingredients were mixed at such temperatures, starting with the low density ethylene polymer, butene-1 copolymer and one or more antioxidants. At this temperature the polymers were allowed to soften under slow mixing, with the tackifier being added at this point. Following homogenization, the low molecular weight polybutene, or amorphous polypropylene, when used, was added in small quantities under continued mixing until the desired homogeneity of the mixture was obtained. When wax was added, this was done at the time of polybutene or amorphous polypropylene addition. Total mixing time ranged from about one to about 1½ hours. The mixed composition was then collected on a release line tray.

The thermal stabilities of the adhesive compositions that were prepared were determined by exposing about 8 to 10 gram quantities of a sample in a five-inch×one-inch test tube to a temperature environment of 350° F. for 24 hours. At the end of the 24 hours, the composition was visually observed for any separation stratification and loss in composition homogeneity. The ring and ball softening points of the compositions were determined according to ASTM Procedure E28. The melt viscosities of the compositions were determined according to ASTM Procedure D 3236, while the needle penetrations were determined according to ASTM D 1321.

To determine peel strength values of the compositions, polyethylene laminated test specimens were prepared by applying the compositions to a 4.0 mil (one inch by four inch) high density polyethylene film by means of a Slautterback "minisquirt" hot melt gun. The composition was applied at 350° F. to the film as a continuous strip ½ inch wide across the film width and then a film of the same dimensions was placed on top of the film carrying the strip of the composition. The laminates were then aged for a minimum of 24 hours prior to testing. Three specimens for each composition were prepared and the bond strength was measured by peeling at the glue line by means of a J. J. Lloyd Tensile Tester at a peel rate of 50 millimeters per minute. The maximum force in grams necessary to cause rupture of the bond was noted. The average of the three such determinations was recorded.

Polypropylene and polypropylene/Kraft laminate test specimens were prepared by applying each of the compositions so prepared to a 3.0 mil (one inch by six inch) polypropylene film or to a 30 pound (one inch by six inch) Kraft strip by means of a Slautterback "minisquirt" hot melt gun. The composition was applied at 350° F. to the film or Kraft paper as a continuous ½ inch strip across the width (one inch) of the substrate. Then a film of the same dimension was placed on top of a film or paper carrying the strip of the composition. The laminates were then aged for 24 hours prior to testing. Testing procedures were the same as for the polyethylene specimens.

The components used in the preparation of the polymer blends are identified below in Table II. In the tables herein the butene-1 copolymers are referred to as polybutylene.

TABLE II

| | List Of Raw Materials | | |
|---|---|---|---|
| | Supplier | Trade Name | Characteristics |
| Polymer | | | |
| Polyethylene (LDPE) | U.S.I. Chemicals | NA 270 | Density, 0.912; M.I. 70 |
| Polyethylene (LDPE) | U.S.I. Chemicals | NA 596 | Density, 0.913; M.I. 150 |
| Polyethylene (LDPE) | U.S.I. Chemicals | NA 597 | Density, 0.927; M.I. 250 |
| Polyethylene (LDPE) | Allied Corp. | AC 1702 | Density, 0.88; Visc. 40 cps(140 C) |
| Polybutylene | Shell Chemical | Duraflex 8410 | Density, 0.895; M.I. 18 |
| Polybutylene | Shell Chemical | Duraflex 8910 | Density, 0.895; M.I. 500 |
| Polybutylene | Shell Chemical | Duraflex 8X10 | Density, 0.895; M.I. 100 |
| Tackifier | | | |
| Petroleum Hydrocarbon Resin | Goodyear Chemicals | Wingtac 10 | Ring & Ball Soft. Pt. 10° C. |
| Petroleum Hydrocarbon Resin | Goodyear Chemicals | Wingtac 95 | Ring & Ball Soft. Pt. 95° C. |
| Petroleum Hydrocarbon Resin | Exxon Chemicals | Escorez 1310 | Ring & Ball Soft. Pt. 95° C. |
| Hydrogenated Cyclopentadiene | Exxon Chemicals | Escorez 5380 | Ring & Ball Soft. Pt. 115° C. |
| Petroleum Hydrocarbon Resin | Hercules Inc. | Piccotac A | Ring & Ball Soft. Pt. 115° C. |
| Polyterpene Resin | Hercules Inc. | Piccolyte C115 | Ring & Ball Soft. Pt. 115° C. |
| Hydrogenated Hydrocarbon Resin | Hercules Inc. | Regalrez 1094 | Ring & Ball Soft. Pt. 115° C. |
| Petroleum Hydrocarbon Resin | Sunbelt Chemicals | Isotac 105 A | Ring & Ball Soft. Pt. 107° C. |
| Petroleum Hydrocarbon Resin | Sunbelt Chemicals | Isotac SB 100A | Ring & Ball Soft. Pt. 103° C. |
| Petroleum Hydrocarbon Resin | Sunbelt Chemicals | Isotac 100R | Ring & Ball Soft. Pt. 99° C. |

TABLE II-continued

| | List Of Raw Materials | | |
|---|---|---|---|
| | Supplier | Trade Name | Characteristics |
| Hydrogenated Polyterpene Resin | Sunbelt Chemicals | Clearon M105 | Ring & Ball Soft. Pt. 105° C. |
| Modified Polyterpene Resin | Arizona Chemicals | Zonatac 105 | Ring & Ball Soft. Pt. 105° C. |
| Petroleum Hydrocarbon Resin | Eastman Chemicals | Eastotac 130 | Ring & Ball Soft. Pt. 130° C. |
| Wax | | | |
| Microcrystalline Wax | Witco Chemicals | Multiwax 180M | Melt Point 185° F. (85° C.) |
| Microcrystalline Wax | Shell Chemical | Shellmax 400 | Melt Point 177° F. (80.55° C.) |
| Paraffin Wax | Shell Chemical | Shellwax 300 | Melt Point 159° F. (70.55° C.) |
| Microcrystalline Wax | Petrolite | Besquare 195 | Melt Point 196° F. (91.1° C.) |
| Microcrystalline Wax | Boler Petroleum | Bowax 425 | Melt Point 183° F. (83.88° C.) |
| Polybutene | | | |
| Low mol. Weight Polybutene | Exxon Chemicals | Parapol 1300 | Molecular Weight 1300 |
| Low mol. Weight Polybutene | Exxon Chemicals | Parapol 2200 | Molecular Weight 2200 |
| Low mol. Weight Polybutene | Chevron | Polybutene PB32 | Molecular Weight 1400 |
| Amorphous Polypropylene & Amorphous Polyalphaolefin | | | |
| Amorphous Polypropylene | Baychem | K-TAC 100C | Viscosity @ 350° F. (176° C.) 2500 cps |
| Amorphous Polypropylene | Baychem | K-TAC 100A | Viscosity @ 350° F. (176° C.) 1450 cps |
| Amorphous Polypropylene | Eastman | Eastobond M-5C | Viscosity @ 350° F. (176° C.) 4650 cps |
| Amorphous Polypropylene | Eastman | Eastobond M-5H | Viscosity @ 350° F. (176° C.) 3300 cps |
| Amorphous Polyalphaolefin | El Paso Products Co | REXTAC B3B15 | Viscosity @ 350° F. (176° C.) 2275 cps |
| Amorphous Polyalphaolefin | El Paso Products Co | REXTAC B6B35 | Viscosity @ 350° F. (176° C.) 4300 cps |
| Amorphous Polyalphaolefin | Huls | VESTOPLAST 703 | Viscosity @ 375° F. (190° C.) 2500 cps |
| Antioxidant | | | |
| Hindered Phenol | Ciba-Geigy | Irganox 1010 | Melt. Point. 100° C. |
| Hindered Phenol | Schenectady Chemicals | Isonox 129 | Melt. Point. 162° C. |
| Dilauryl thiodipropionate (DLTDP) | Evans Chemetics | DLTDP | Melt. Point. 40° C. |

The data so obtained are set forth below in Table III.

TABLE III

| | Base Runs | | | | | | | | | |
|---|---|---|---|---|---|---|---|---|---|---|
| | Run # | | | | | | | | | |
| | 1 | 2 | 3 | 4 | 5 | 6 | 7 | 8 | 9 | 10 |
| | PARTS BY WEIGHT, GRAMS | | | | | | | | | |
| LDPE, NA 270 | 17.50 | 22.50 | 15.00 | 15.00 | 15.00 | 15.00 | 15.00 | 30.00 | 30.00 | 30.00 |
| Polybutylene, Duraflex 8410 | — | — | 15.00 | 15.00 | 15.00 | 15.00 | 15.00 | — | — | — |
| Polybutylene, Duraflex 8910 | 17.50 | 22.50 | — | — | — | — | — | — | — | — |
| Wingtack 95 (Tackifier) | 35.00 | 55.00 | 35.00 | 35.00 | 30.00 | 35.00 | 35.00 | 35.00 | 30.00 | 30.00 |
| Wingtack 10 (Tackifier) | 30.00 | — | — | — | — | — | — | — | — | — |
| Multiwax 180 M (Wax) | — | — | — | — | 40.00 | 35.00 | — | — | 25.00 | — |
| Shellmax 400 (wax) | — | — | 35.00 | — | — | — | — | 35.00 | — | 25.00 |
| Besquare 195 (Wax) | — | — | — | 35.00 | — | — | — | — | — | — |
| Bowax 425 (Wax) | — | — | — | — | — | — | 35.00 | — | — | — |
| Parapol 2200, Low mol. Weight polybutene | — | — | — | — | — | — | — | — | 15.00 | 15.00 |
| Isonox 129/DLTDP(1:3 wt. ratio) | 0.40 | 0.40 | 0.40 | 0.40 | 0.40 | 0.40 | 0.40 | 0.40 | 0.40 | 0.40 |
| Total | 100.4 | 100.4 | 100.4 | 100.4 | 100.4 | 100.4 | 100.4 | 100.4 | 100.4 | 100.4 |
| Properties | | | | | | | | | | |
| Stability | sep | Ok | sep | sep | sep | sep | sep | Ok | Ok | Ok |
| Ring & Ball Softening Point (R & B), °F. | 185 | 232 | 217 | 218 | 214 | 219 | 221 | 215 | 217 | 217 |
| Viscosity, cps, 350° F. | 1975 | 39250 | 2200 | 2500 | 2250 | 2650 | 2500 | 1000 | 1350 | 1300 |
| N.P., decimillimeter (dmm), 77° F. | 25.7 | 19 | 4.8 | 3.1 | 5.8 | 8.6 | 5.4 | 4.1 | 7.4 | 6.5 |
| Performance | | | | | | | | | | |
| Peel Strength, g/in, 50 mm/min | | | | | | | | | | |
| HDPE/HDPE (4 Mil) | — | 272 | 817 | — | 750 | — | 727 | Fail | 810 | — |
| PP/PP (3 Mil) | — | Fail | Fail | — | — | — | Fail | Fail | Fail | Fail |
| PP(3 Mil)-K(30 lb) | — | — | Fail | — | — | — | 454 | — | Fail | — |

In the above Table III it can be seen from Runs No. 1 and 2 that an adhesive composition containing solely a low density ethylene polymer, a butene-1 copolymer and a tackifier as their sole basic constituents is not particularly suitable as a hot melt adhesive. In Run No. 1 the composition was unstable. The composition of Run No. 2 had a viscosity so high that it was practically impossible to determine whether or not separation of the components had occurred. Desirably, a hot melt adhesive should possess a viscosity below about 15,000, preferably in the range of about 500 to about 10,000 for ease of application to a substrate. A value of 39,250, as obtained in Run No. 2, is far too high to render the adhesive as a practical one for commercial use. Moreover, while the peel strength was satisfactory when the substrates were high density polyethylenes, failure was encountered when polypropylene substrates were used. The presence of wax in the various compositions in Runs Nos. 3 to 7 failed to improve their properties or performance characteristics. The composition of Run No. 8 containing solely a low density polyethylene, tackifier and wax, but no butene-1 copolymer was stable and had no satisfactory adhesive properties. The addition of a low molecular weight polybutene in Run No. 9 to a composition similar to Run No. 8 was also stable but failed as an adhesive with polypropylene and Kraft paper substrates. Run No. 10 is similar to Run No. 9 and also failed as an adhesive using polypropylene substrates.

Table IV clearly shows that when the adhesive composition of this invention contains the required components, that is, a low density ethylene polymer, a butene-1 copolymer, a hydrocarbon tackifier and a low molecular weight liquid polybutene (Runs Nos. 11 and 12), and wax as an additional component to reduce its viscosity (Runs Nos. 13, 14 and 15), the adhesive is stable and exhibits excellent adhesive properties.

TABLE IV

Effect Of Low Molecular Weight Polybutene On Blend Performance

| | Run # | | | | |
|---|---|---|---|---|---|
| | 11 | 12 | 13 | 14 | 15 |
| | PARTS BY WEIGHT, GRAMS | | | | |
| LDPE, NA 270 | 24.50 | 15.00 | 15.00 | 15.00 | 15.00 |
| Polybutylene, Duraflex 8410 | 10.50 | 15.00 | 15.00 | 15.00 | 15.00 |
| Wingtack 95 | 35.00 | 30.00 | 30.00 | 30.00 | 30.00 |
| ShellWax 300 | — | — | 25.00 | — | — |
| Multiwax 180 M | — | — | — | — | 25.00 |
| Shellmax 400 | — | — | — | 25.00 | — |
| Parapol 2200 | 30.00 | 40.00 | 15.00 | 15.00 | 15.00 |
| Isonox 129/DLTDP (1:3 wt. ratio) | 0.40 | 0.40 | 0.40 | 0.40 | 0.40 |
| Total | 100.4 | 100.4 | 100.4 | 100.4 | 100.4 |
| Properties | | | | | |
| Stability | ok | ok | ok | ok | ok |
| R & B, °F. | 231 | 224 | 217 | 216 | 213 |
| Viscosity, cps, 350° F. | 6950 | 4050 | 3350 | 3700 | 2750 |
| N.P., dmm, 77° F. | 15.0 | 31.5 | 5.3 | 9.8 | 11.5 |
| Performance Peel Strength, g/in, 50 mm/min. | | | | | |
| HDPE/HDPE (4 mil) | 2880 | 1590 | 900 | 1980 | 2385 |
| PP/PP (3 mil) | 2790 | 1350 | 390 | 1350 | 720 |
| PP(3 mil)/k (30 lb) | 1485 | 1080 | 720 | 1080 | 630 |

Table V shows that even when a different polybutene is used and the amounts of the components are varied, a stable adhesive displaying excellent adhesive properties is obtained.

TABLE V

Effect of Polyethylene/Polybutylene Polymer Ratio On Blend Performance

| | Run # | | | |
|---|---|---|---|---|
| | 16 | 17 | 18 | 19 |
| | PARTS BY WEIGHT, GRAMS | | | |
| LDPE, NA 270 | 25.00 | 10.00 | 17.50 | 17.50 |
| Polybuytlene, Duraflex 8910 | 10.00 | 25.00 | 17.50 | 17.50 |
| Wingtac 95 | 35.00 | 35.00 | 35.00 | 35.00 |
| Parapol 1300 | — | — | — | 30.00 |
| Parapol 2200 | 30.00 | 30.00 | 30.00 | — |
| Isonox 129/DLTDP (1:3 wt. ratio) | 0.40 | — | — | 0.40 |
| Irganox 1010/DLTDP (1:1 wt. ratio) | — | 0.60 | 0.60 | — |
| Total | 100.4 | 100.6 | 100.6 | 100.4 |
| Properties | | | | |
| Stability | ok | ok | ok | ok |
| R & B, °F. | 227 | 197 | 218 | 210 |
| Viscosity @ 350° F. | 4250 | 3100 | 3000 | 2700 |
| N.P., dmm, 77° F. | 15.6 | 27.2 | 27.1 | 37.8 |
| Performance Peel Strength, g/in, 50 mm/min. | | | | |
| HDPE/HDPE (4 mil) | 3246 | 2835 | 2400 | 1440 |
| PP/PP (3 mil) | 2565 | 2025 | 585 | 990 |
| PP(3 mil)/K(30 lb) | 2200 | 2610 | 945 | 1440 |

The runs in Table VI are similar to Run No. 16 in Table V except that various tackifiers (Runs No. 20 to 25) and combinations of tackifiers (Runs Nos. 26 and 27) were used. The same excellent results were obtained. Peel strength tests were not carried out in all of the substrates in Runs Nos. 21 to 26, because it would have been expected that excellent results would have been obtained in light of the previous runs and Runs Nos. 20 and 27 in Table VI.

TABLE VI

Effect Of Tackifier Type On Blend Properties

| | Run # | | | | | | | |
|---|---|---|---|---|---|---|---|---|
| | 20 | 21 | 22 | 23 | 24 | 25 | 26 | 27 |
| | PARTS BY WEIGHT, GRAMS | | | | | | | |
| LDPE, NA 270 | 25.00 | 25.00 | 25.00 | 25.00 | 25.00 | 25.00 | 25.00 | 25.00 |
| Polybutylene, Duraflex 8910 | 10.00 | 10.00 | 10.00 | 10.00 | 10.00 | 10.00 | 10.00 | 10.00 |
| Wingtack 95 | — | — | — | — | — | — | 17.50 | — |
| Piccotac A | 35.00 | — | — | — | — | — | — | 17.50 |
| Regalrez 1094 | — | 35.00 | — | — | — | — | — | — |
| Eastotac 130 | — | — | 35.00 | — | — | — | — | — |
| Isotac 105A | — | — | — | 35.00 | — | — | — | — |
| Isotac SB100A | — | — | — | — | 35.00 | — | — | — |
| Isotac 100 R | — | — | — | — | — | — | 17.50 | — |
| Escorez 1310 | — | — | — | — | — | 35.00 | — | 17.50 |
| Parapol 2200 | 30.00 | 30.00 | 30.00 | 30.00 | 30.00 | 30.00 | 30.00 | 30.00 |
| Isonox 129/DLTDP (1:3 Wt. ratio) | 0.40 | 0.40 | 0.40 | 0.40 | 0.40 | 0.40 | — | — |
| Irganox 1010/DLTDP (1:1 Wt. ratio) | — | — | — | — | — | — | 0.60 | 0.60 |
| Total | 100.4 | 100.4 | 100.4 | 100.4 | 100.4 | 100.4 | 100.6 | 100.6 |
| Properties | | | | | | | | |
| Stability | ok | ok | ok | ok | ok | ok | ok | ok |
| R & B, °F. | 229 | 224 | 218 | 225 | 225 | 226 | 209 | 228 |
| Viscosity, cps, 350° F. | 2225 | 4425 | 5400 | 4500 | 2950 | 3800 | 5400 | 5300 |
| N.P., dmm, 77° F. | 19.7 | 17.2 | 16.8 | 17.7 | 20.9 | 17.4 | 19.6 | 18.4 |
| Performance Peel Strength, g/in, 50 mm/min. | | | | | | | | |
| HDPE/HDPE (4 mil) | 3856 | 3629 | 4506 | 3459 | 2087 | 1587 | 3178 | 3405 |

TABLE VI-continued

Effect Of Tackifier Type On Blend Properties

| | Run # | | | | | | | |
|---|---|---|---|---|---|---|---|---|
| | 20 | 21 | 22 | 23 | 24 | 25 | 26 | 27 |
| | PARTS BY WEIGHT, GRAMS | | | | | | | |
| PP/PP (3 mil) | 2790 | 2700 | — | — | — | 1417 | — | 1980 |
| PP(3 mil)/K(30 lb.) | 2700 | 2430 | — | — | — | — | — | 1896 |
| LDPE(1.5 mil)/K(30 lb) | 1370 | — | — | — | — | 1701 | 560 | 577 |

Table VII illustrates further aspects of our novel adhesive composition. Thus, while wax was present in Runs Nos. 28, 29 and 30, but not in Runs Nos. 31, 32 and 33, and the amount of low molecular weight liquid polybutene in Runs Nos. 31, 32 and 33 was greater than the other runs in Table VII, a stable composition having excellent adhesion properties was obtained in all cases. Although peel strength tests were not carried with all of the substrates in Runs Nos. 31, 32 and 33 it would have been expected that excellent results would have been obtained in light of the other test results obtained in Table VII.

TABLE VII

Effect of Tackifier Variation On Blend Performance

| | Run # | | | | | |
|---|---|---|---|---|---|---|
| | 28 | 29 | 30 | 31 | 32 | 33 |
| | PARTS BY WEIGHT, GRAMS | | | | | |
| LDPE, NA 270 | 15.00 | 15.00 | 15.00 | 12.50 | 12.50 | 12.50 |
| Polybutylene, Duraflex 8410 | 15.00 | 15.00 | 15.00 | 12.50 | 12.50 | 12.50 |
| Wingtack 95 | 30.00 | — | — | — | — | — |
| Escorez 1310 | — | 30.00 | — | — | — | — |
| Zonatac 105 | — | — | — | 25.00 | — | — |
| Clearon M105 | — | — | — | — | 25.00 | — |
| Escorez 5380 | — | — | — | — | — | 25.00 |
| Piccolyte C115 | — | — | 30.00 | — | — | — |
| Besquare 195 | 25.00 | 25.00 | 25.00 | — | — | — |
| Parapol 2200 | 15.00 | 15.00 | 15.00 | 50.00 | 50.00 | 50.00 |
| Isonox 129/DLTDP (1:3 wt. ratio) | 0.40 | 0.40 | 0.40 | 0.40 | 0.40 | 0.40 |
| Total | 100.4 | 100.4 | 100.4 | 100.4 | 100.4 | 100.4 |
| Properties | | | | | | |
| Stability | ok | ok | ok | ok | ok | ok |
| R & B, °F. | 224 | 227 | 211 | 299 | 222 | 220 |
| Viscosity, cps, 350° F. | 3100 | 2825 | 2050 | 1800 | 1850 | 1850 |
| N.P., dmm, 77° F. | 8.6 | 7 | 4.3 | 62.4 | 64.4 | 66.6 |
| Performance | | | | | | |
| Peel Strength, g/in, 50 mm/min. | | | | | | |
| HDPE/HDPE(4 mil) | 3420 | 3420 | 1215 | 680 | 453 | 680 |
| PP-PP(3 mil) | 225 | 300 | 180 | 907 | 1360 | 680 |
| PP(3 mil)/K(30 lb.) | 675 | 450 | 450 | — | — | — |

Table VIII clearly shows that the components, and the amounts thereof, making up the novel adhesive composition claimed herein can be varied over a wide range and a stable composition possessing excellent adhesive properties will still be obtained.

TABLE VIII

Effect of Polybutene Level On Blend Performance Properties & Performance

| | Run # | | | | | |
|---|---|---|---|---|---|---|
| | 34 | 35 | 36 | 37 | 38 | 39 |
| | PARTS BY WEIGHT, GRAMS | | | | | |
| LDPE, NA 270 | 24.50 | 25.00 | 17.50 | 15.00 | 15.00 | 12.50 |
| Polybutylene, Duraflex 8410 | 10.50 | 10.00 | 17.50 | 15.00 | — | — |
| Polybutylene, Duraflex 8X10* | — | — | — | — | 15.00 | 12.50 |
| Wingtack 95 | — | 35.00 | — | — | 30.00 | 25.00 |
| Escorez 1310 | 35.00 | — | 35.00 | 30.00 | — | — |
| PB 32 | 30.00 | — | — | 40.00 | — | — |
| Parapol 2200 | — | 30.00 | 30.00 | — | 40.00 | 50.00 |
| Isonox 129/DLTDP (1:3 Wt. ratio) | 0.40 | 0.40 | 0.40 | 0.40 | 0.40 | 0.40 |
| Total | 100.4 | 100.4 | 100.4 | 100.4 | 100.4 | 100.4 |
| Properties | | | | | | |
| Stability | ok | ok | ok | ok | ok | ok |
| R & B, °F. | 224 | 227 | 223 | 223 | 218 | 211 |
| Viscosity, cps, 350° F. | 7550 | 6000 | 8150 | 5400 | 2250 | — |
| Viscosity, cps, 375° F. | — | — | 6300 | — | — | 1050 |
| N.P., dmm, 77° F. | 24.6 | 9.0 | 19.7 | 41.9 | 48.2 | 133 |
| Performance | | | | | | |
| Peel Strength, g/in, 50 mm/min. | | | | | | |
| HDPE/HDPE(4 mil) | 2115 | 3587 | 3541 | 1305 | 945 | 360 |
| PP/PP(3 mil) | 960 | 2925 | 3078 | 810 | 540 | 315 |
| PP(3 mil)/K(30 lb.) | 1080 | 2640 | 3178 | 750 | 540 | 405 |

*Duraflex 8X10-Experimental Product, 100 M.I.

Runs similar to the runs carried out in Table Nos. IV to VIII were made but wherein the low molecular weight liquid polybutenes were replaced with an amorphous polypropylene. The data so obtained are summarized below in Tables IX, X and XI.

TABLE IX

Amorphous Polypropylene Based Blends

| | Run # | | | | |
|---|---|---|---|---|---|
| | 40 | 41 | 42 | 43 | 44 |
| | PARTS BY WEIGHT, GRAMS | | | | |
| LDPE, NA 270 | 12.50 | 12.50 | 12.50 | 12.50 | 12.50 |
| Polybutylene, Duraflex 8910 | 12.50 | 12.50 | 12.50 | 12.50 | 12.50 |
| Wingtac 95 | 25.00 | 25.00 | — | — | 25.00 |
| Piccolyte C 115 | — | — | 25.00 | — | — |
| Escorez 1310 | — | — | — | 25.00 | — |
| APP, K-TAC 100C | 50.00 | — | — | — | — |
| APP, K-TAC 100A | — | 50.00 | 50.00 | 50.00 | 25.00 |
| Shellmax 400 | — | — | — | — | 25.00 |
| Isonox 129/DLTDP (1:3 wt. ratio) | — | — | 0.40 | 0.40 | 0.40 |
| Isonox 129/DLTDP (1:1 wt. ratio) | 0.60 | 0.60 | — | — | — |
| Total | 100.6 | 100.6 | 100.4 | 100.4 | 100.4 |
| Properties | | | | | |
| Stability | ok | ok | ok | ok | ok |
| R & B, °F. | 301 | 287 | 298 | 288 | 228 |
| Viscosity, cps, 350° F. | 3600 | 2875 | 4250 | 3400 | 1100 |
| N.P. dmm, 77° F. | 19 | 21 | 20.5 | 25.8 | 18.3 |
| Performance | | | | | |
| Peel Strength, g/in, 50 mm/min. | | | | | |
| HDPE/HDPE(4 mil) | 2722 | 1544 | 5670 | 2835 | 2610 |
| PP/PP(3 mil) | 1588 | 2111 | 2970 | 1755 | 1620 |
| PP(3 mil)/K(30 lb.) | 2270 | 2497 | 2730 | 1755 | 1530 |

TABLE X

Amorphous Polyalphaolefin Blends

| | Run # | | | | | | | |
|---|---|---|---|---|---|---|---|---|
| | 45 | 46 | 47 | 48 | 49 | 50 | 51 | 52 |
| | PARTS BY WEIGHT, GRAMS | | | | | | | |
| LDPE, NA 270 | 25.00 | 20.00 | 12.50 | 12.50 | 12.50 | 12.50 | 12.50 | 12.50 |
| Polybutylene, Duraflex 8410 | — | — | — | 12.50 | — | — | — | — |
| Polybutylene, Duraflex 8910 | 10.00 | 10.00 | 12.50 | — | 12.50 | 12.50 | 12.50 | 12.50 |
| Wingtac 95 | 35.00 | 35.00 | 25.00 | 25.00 | 25.00 | 25.00 | 25.00 | 25.00 |
| Amorphous Polyphaolefin, REXTAC B3B15 | — | — | — | — | — | 50.00 | 25.00 | — | — |
| Amorphous Polyalphaolefin, REXTAC B6B35 | 30.00 | 30.00 | 50.00 | 50.00 | — | — | — | — |
| Amorphous Polypropylene, Eastobond M-5H | — | — | — | — | — | — | 50.00 | — |
| Amorphous Polyalphaolefin, Vestoplast 703 | — | — | — | — | — | — | — | 50.00 |
| Shellmax 400 | — | 5.00 | — | — | — | 25.00 | — | — |
| Isonox/DLTDP(1:3 wt. ratio) | 0.40 | 0.40 | 0.40 | 0.40 | 0.40 | 0.40 | 0.40 | 0.40 |
| Total | 100.4 | 100.4 | 100.4 | 100.4 | 100.4 | 100.4 | 100.4 | 100.4 |
| Properties | | | | | | | | |
| Stability | ok | ok | ok | ok | ok | ok | ok | ok |
| R & B, °F. | 247 | 246 | 260 | 262 | 275 | 253 | 298 | 254 |
| Viscosity, cps, 350° F. | 5700 | 5150 | 5500 | 8550 | 3450 | 1200 | 4350 | 4900 |
| N.P., dmm, 77° F. | 18.8 | 17.4 | 31.1 | 34.9 | 22.8 | 16.3 | 16.7 | 11.1 |
| Performance | | | | | | | | |
| Peel Strength, g/in, 50 mm/min. | | | | | | | | |
| HDPE/HDPE(4 mil) | 4184 | 5217 | 2382 | 1725 | 2295 | 2295 | 3060 | 3960 |
| PP/PP(3 mil) | — | — | — | — | 2295 | 1980 | 3060 | 2655 |
| PP(3 mil)/K(30 lb) | — | — | — | — | 1710 | 1240 | — | — |
| LDPE(1.5 mil)/K(30 lb) | 975 | 943 | 943 | 1180 | — | — | — | — |

TABLE XI

Amorphous Polypropylene & Corrospending Wax Based Blends

| | Run # | |
|---|---|---|
| | 53 | 54 |
| | PARTS BY WEIGHT, GRAMS | |
| LDPE, NA 270 | 25 | 25 |
| Polybutylene, Duraflex 8910 | 10 | 10 |
| Wingtack 95 | 35 | 35 |
| APP, Eastman M-5C | 30 | 15 |
| Shellmax 400 | — | 15 |
| Isonox 129/DLTDP (1:3 Wt. ratio) | 0.4 | 0.4 |
| Total | 100.4 | 100.4 |
| Properties | | |
| Stability | ok | ok |
| R & B, °F. | 217 | 225 |
| Viscosity, cps, 350° F. | 6550 | 3300 |
| N.P., dmm, 77° F. | 16.2 | 10 |
| Performance | | |
| Peel Strength, g/in, 50 mm/min | | |
| HDPE/HDPE(4 mil) | 5130 | 720 |
| PP/PP(3 mil) | 2520 | 360 |
| PP(3 mil)/K(30 lb) | 1740 | 360 |

TABLE XII

Effect Of Polyethylene Type On Blend Performance

| | Run # | | |
|---|---|---|---|
| | 55 | 56 | 57 |
| | PARTS BY WEIGHT, GRAMS | | |
| LDPE, AC 1702 | 17.50 | — | — |
| LDPE, NA596 | — | 17.50 | — |
| LDPE, NA597 | — | — | 17.50 |
| Polybutylene, Duraflex 8410 | 17.50 | 17.50 | 17.50 |
| Escorez 1310 | 35.00 | 35.00 | 35.00 |
| Parapol 2200 | 30.00 | 30.00 | 30.00 |
| Isonox 129/DLTDP (1:3 Wt. ratio) | 0.40 | 0.40 | 0.40 |
| Total | 100.4 | 100.4 | 100.4 |
| Properties | | | |
| Stability | ok | ok | ok |
| R & B, °F. | 207 | 230 | 239 |
| Viscosity, cps, 350° F. | 2050 | 8900 | 5400 |
| N.P., dmm, 77° F. | 60.5 | 17.4 | 20.9 |
| Performance | | | |
| Peel Strength, g/in, 50 mm/min | | | |
| HDPE/HDPE(4 mil) | 765 | 4140 | 4320 |
| PP/PP(3 mil) | 450 | 2970 | 2250 |

The data in Tables IX, X and XI show that the same excellent polymer blends were obtained when an amorphous polypropylene was used in place of the low molecular weight liquid polybutene. Although performance data were not taken in connection with all of the substrates in each of the runs in Table X, it would have been expected that in view of the results obtained in Tables IX and XI, the same excellent results would still have been obtained had the remaining runs been fully carried out.

An additional series of runs was carried out wherein the novel polymer blend claimed herein was prepared using additional low density ethylene polymers. As the data in Table XII show, excellent results were again obtained.

Obviously, many modifications and variations of the invention, as hereinabove set forth, can be made without departing from the spirit and scope thereof and therefore only such limitations should be imposed as are indicated in the appended claims.

We claim:

1. A compatible polymer blend comprising a low density ethylene polymer, a copolymer of butene-1 and from about 1.5 to about 20 weight percent of an olefin selected from the group consisting of ethylene and propylene, a hydrocarbon tackifier and a low molecular weight polymer selected from the group consisting of a low molecular weight liquid polybutene, an amorphous polypropylene and mixtures thereof.

2. The polymer blend of claim 1 wherein said copolymer is a copolymer of butene-1 and ethylene.

3. The polymer blend of claim 2 wherein said low molecular weight polymer is a low molecular weight liquid polybutene.

4. The polymer blend of claim 2 wherein said low molecular weight polymer is an amorphous polypropylene.

5. The polymer blend of claim 1 wherein said amorphous polypropylene is obtained as a byproduct during the production of crystalline polypropylene.

6. The polymer blend of claim 1 wherein said amorphous polypropylene is obtained as a direct product of the polymerization of propylene without the formation of crystalline polypropylene.

7. The polymer blend of claim 2 wherein said low molecular weight polymer is a mixture of a low molecular weight liquid polybutene and an amorphous polypropylene.

8. The polymer blend of claim 7 wherein said mixture contains from about 97.5 to about 2.5 weight percent of amorphous polypropylene.

9. The polymer blend of claim 7 wherein said mixture contains from about 75 to about 40 weight percent of amorphous polypropylene.

10. The polymer blend of claim 2 wherein said low density ethylene polymer has a density of about 0.88 to about 0.94 and a melt index in the range of about 3 to about 5000 grams/10 minutes.

11. The polymer blend of claim 2 wherein said low density ethylene polymer has a density of about 0.88 to about 0.93 and a melt index of about 20 to about 500 grams/10 minutes.

12. The polymer blend of claim 2 wherein said butene-1 copolymer has a melt index in the range of about 0.3 to about 2000 grams/10 minutes.

13. The polymer blend of claim 2 wherein said butene-1 copolymer has a melt index in the range of about 3.0 to about 2000 grams/10 minutes.

14. The polymer blend of claim 2 wherein said hydrocarbon tackifier has a ring and ball softening point in the range of about 10° to about 150° C.

15. The polymer blend of claim 2 wherein said hydrocarbon tackifier has a ring and ball softening point in the range of about 10° to about 140° C.

16. The polymer blend of claim 2 wherein said low molecular weight polymer is a low molecular weight liquid polybutene having a molecular weight from about 500 to about 5000.

17. The polymer blend of claim 2 wherein said low molecular weight polymer is a low molecular weight liquid polybutene having a molecular weight from about 1300 to about 3000.

18. The polymer blend of claim 2 wherein said low molecular weight polymer is an amorphous polypropylene having a crystallinity of les than about 10 weight percent and a molecular weight in the range of about 300 to about 20,000.

19. The polymer blend of claim 2 wherein said low molecular weight polymer is an amorphous polypropylene having a crystallinity of less than about five weight percent and a molecular weight in the range of about 1000 to about 15,000.

20. The polymer blend of claim 2 wherein said low density ethylene polymer has a density of about 0.88 to about 0.94 and a melt index of about 3 to about 5000 grams/10 minutes, said butene-1 copolymer has a melt index in the range of about 0.3 to about 2000 grams/10 minutes, said hydrocarbon tackifier has a ring and ball softening point in the range of about 10° to about 150° C. and said low molecular weight polymer is a low molecular weight liquid polybutene having a molecular weight from about 500 to about 5000.

21. The polymer blend of claim 2 wherein said low density ethylene polymer has a density of about 0.88 to about 0.93 and a melt index of about 20 to about 500 grams/10 minutes, said butene-1 copolymer has a melt index in the range of 3.0 to about 2000 grams/10 minutes, said hydrocarbon tackifier has a ring and ball softening point in the range of about 10° to about 140° C. and said low molecular weight polymer is a low molecular weight liquid polybutene having a molecular weight from about 1300 to 3000.

22. The polymer blend of claim 2 wherein said low density ethylene polymer has a density of about 0.88 to about 0.94 and a melt index in the range of about 3 to about 5000 grams/10 minutes, said butene-1 copolymer has a melt index in the range of about 0.3 to about 2000 grams/10 minutes, said hydrocarbon tackifier has a ring and ball softening point in the range of about 10° to about 150° C. and said low molecular weight polymer is an amorphous polypropylene having a crysytallinity of less than about 10 weight percent and a molecular weight in the range of about 300 to about 20,000.

23. The polymer blend of claim 2 wherein said low density ethylene polymer has a density of about 0.88 to about 0.93 and a melt index in the range of about 20 to about 500 grams/10 minutes, said butene-1 copolymer has a melt index in the range of about 3.0 to about 2000 grams/10 minutes, said hydrocarbon tackifier has a ring and ball softening point in the range of about 10° to about 140° C. and said low molecular weight polymer is an amorphous polypropylene having a crystallinity of less than about five weight percent and a molecular weight in the range of about 1000 to about 15,000.

24. The polymer blend of claim 2 wherein said components are present in the following amounts:

|  | Weight Percent |
| --- | --- |
| Low Density Ethylene Polymer | 2.5–40 |
| Butene-1 Copolymer | 5–60 |
| Hydrocarbon Tackifier | 5–40 |
| Low Molecular Weight Liquid Polybutene or Amorphous Polypropylene | 5–60 5–87.5 |

25. The polymer blend of claim 2 wherein said components are present in the following amounts:

|  | Weight Percent |
| --- | --- |
| Low Density Ethylene Polymer | 5–30 |
| Butene-1 Copolymer | 10–50 |
| Hydrocarbon Tackifier | 10–35 |
| Low Molecular Weight Liquid Polybutene or Amorphous Polypropylene | 10–40 10–75 |

26. The polymer blend of claim 24 wherein the weight ratio of low density ethylene polymer to the butene-1 copolymer is in the range of about 9:1 to about 1:9.

27. The polymer blend of claim 25 wherein the weight ratio of low density ethylene polymer to the butene-1 copolymer is in the range of about 1:3 to about 3:1.

28. The polymer blend of claim 2 wherein a paraffin or microcrystalline wax is also present.

29. The polymer blend of claim 2 wherein an antioxidant is also present.

30. The polymer blend of claim 2 wherein a paraffin wax or microcrystalline wax and an antioxidant is also present.

* * * * *